(12) United States Patent
Crough

(10) Patent No.: US 9,533,536 B2
(45) Date of Patent: Jan. 3, 2017

(54) AERODYNAMIC AMPHIBIOUS RECUMBENT CYCLE AND KAYAK

(71) Applicant: Daniel S. Crough, Southampton, NY (US)

(72) Inventor: Daniel S. Crough, Southampton, NY (US)

( * ) Notice: Subject to any disclaimer, the term of this patent is extended or adjusted under 35 U.S.C. 154(b) by 30 days.

(21) Appl. No.: 14/068,767

(22) Filed: Oct. 31, 2013

(65) Prior Publication Data

US 2014/0120789 A1    May 1, 2014

Related U.S. Application Data

(60) Provisional application No. 61/720,441, filed on Oct. 31, 2012.

(51) Int. Cl.
*B60F 3/00* (2006.01)
*B63B 35/71* (2006.01)

(52) U.S. Cl.
CPC .............. *B60F 3/0084* (2013.01); *B63B 35/71* (2013.01)

(58) Field of Classification Search
CPC ......... B60F 3/0084; B60F 3/00; B60F 3/0069; B63B 35/71
USPC ........... 440/12.5, 12.62, 12.64, 12.66, 12.69, 440/12.51, 12.52, 12.53, 12.54, 12.55, 440/12.58, 12.6, 12.63, 12.68
See application file for complete search history.

(56) References Cited

U.S. PATENT DOCUMENTS

| 2,979,016 | A | * | 4/1961 | Rossi | B60B 15/00 440/100 |
| 5,607,171 | A | * | 3/1997 | Labranche | 280/288.1 |
| 5,727,494 | A | * | 3/1998 | Caserta et al. | 114/55.51 |
| 7,445,530 | B2 | * | 11/2008 | Munshaur et al. | 440/12.66 |
| 2002/0002939 | A1 | * | 1/2002 | Beauchesne et al. | 114/382 |
| 2012/0242058 | A1 | * | 9/2012 | Haimoff | B62K 3/02 280/281.1 |

FOREIGN PATENT DOCUMENTS

FR        2532593 A  *  3/1984

* cited by examiner

*Primary Examiner* — Anthony Wiest
(74) *Attorney, Agent, or Firm* — David L. Nocilly; Bond Schoeneck & King, PLLC

(57) ABSTRACT

A human powered aerodynamic amphibious recumbent vehicle having an outer shell that operates as the cycle exoskeleton, aerodynamic fairing, and boat hull. The vehicle includes a propulsion design adding paddles to the front drive wheels or pairing traditional pedaling to a propeller mounted on a kayak rudder via a flexible axle. Composite materials are used to form the vehicle and allow it to remain lightweight, abrasion tolerant, structurally rigid under rigorous operating conditions, and waterproof. The vehicle can enter and exit the water by riding directly in and out, or can be lifted by one person safely.

2 Claims, 9 Drawing Sheets

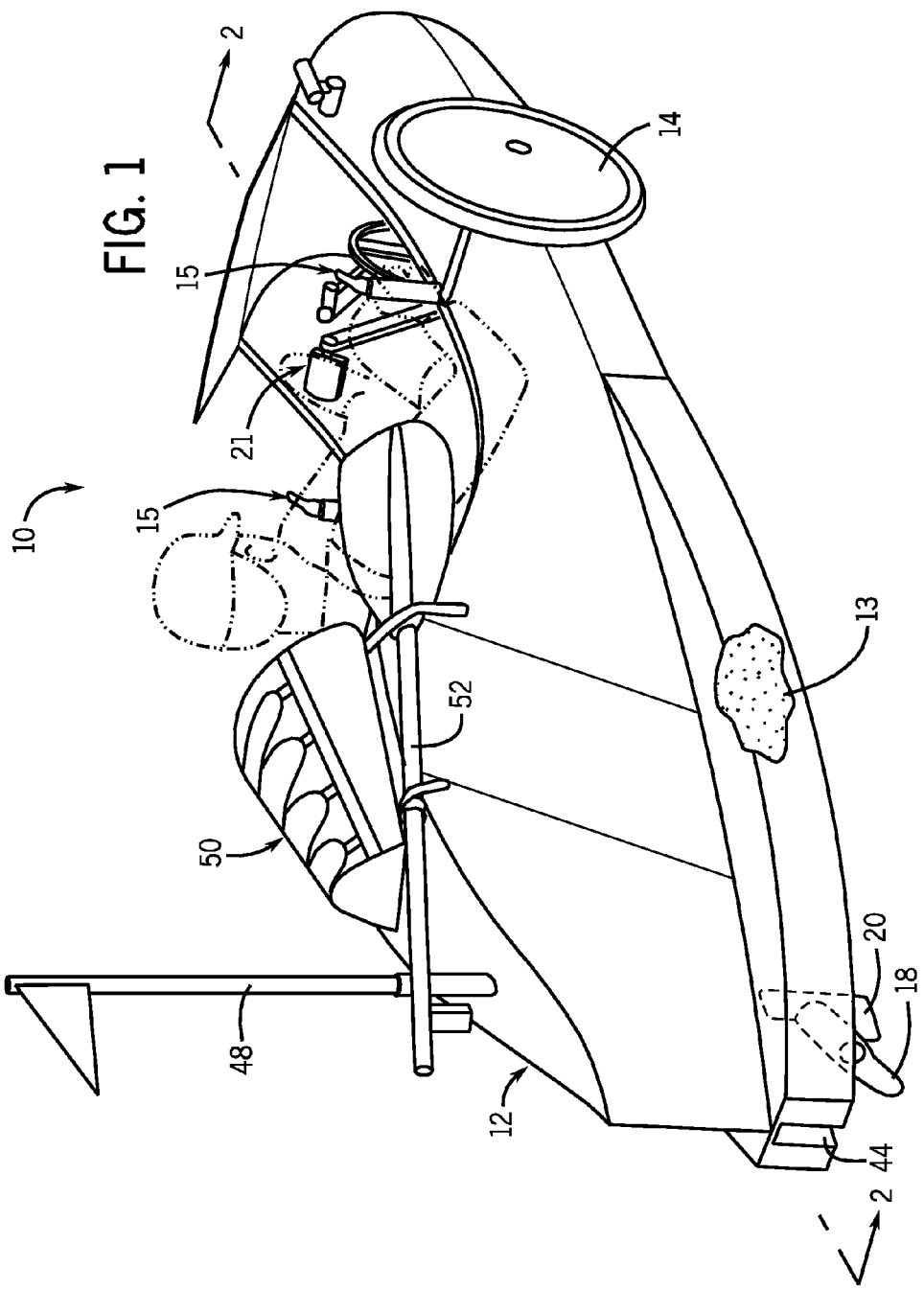

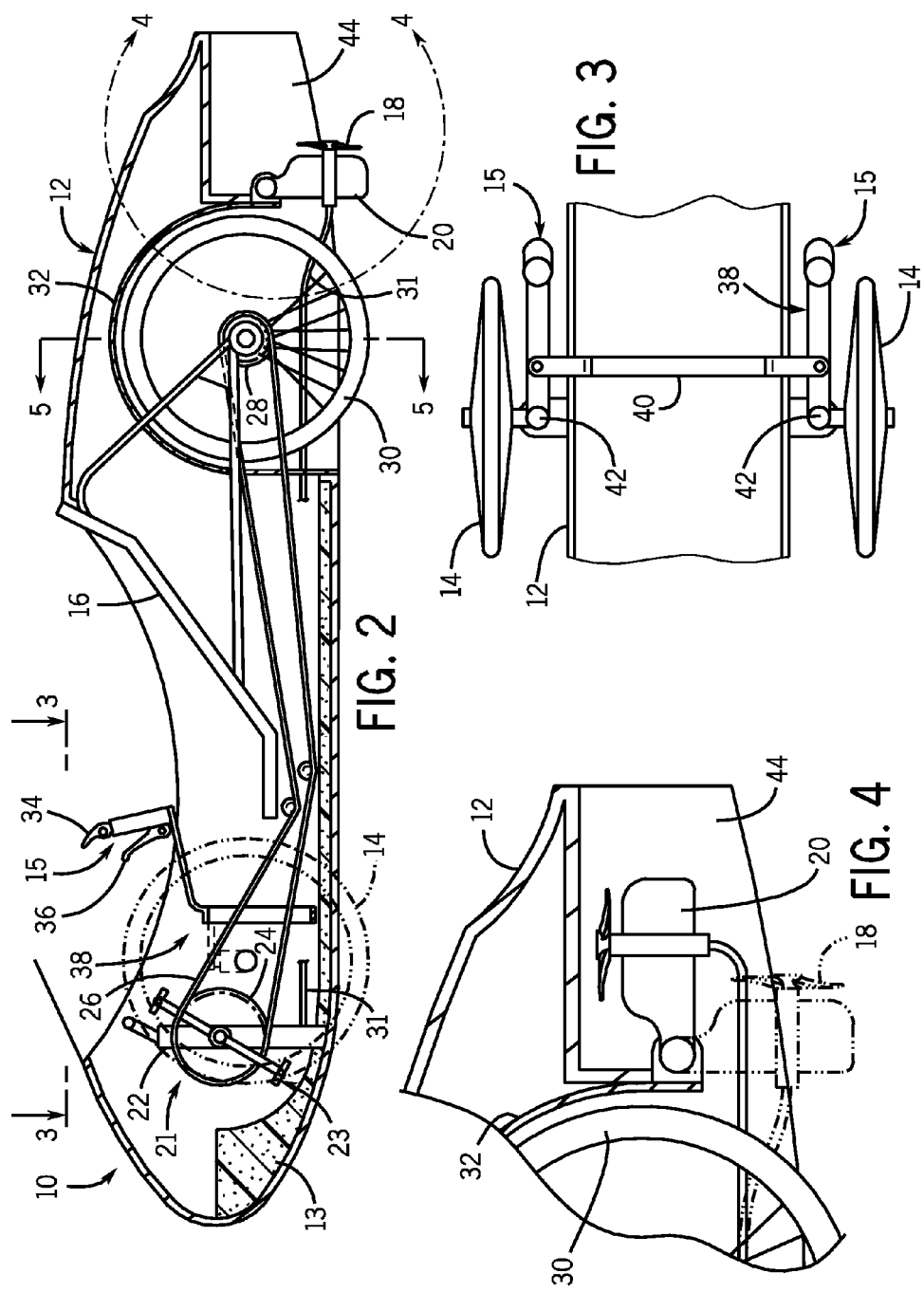

AERODYNAMIC AMPHIBIOUS RECUMBENT CYCLE AND KAYAK

CROSS-REFERENCE TO RELATED APPLICATIONS

The present application claims priority to U.S. Provisional No. 61/720,441, filed on Oct. 31, 2012.

BACKGROUND OF THE INVENTION

1. Field of the Invention

The present invention relates to amphibious human powered vehicles and, more particularly, to an amphibious recumbent cycle and kayak.

2. Description of the Related Art

Conventional, human-powered amphibious vehicles are often cumbersome in design and, as result, less then efficient when used on land and in the water. For example, some attempts to provide an amphibious, human powered vehicle involve the use of significantly oversized tires that double as floats. Such craft are obviously inefficient, particularly on land, and thus do not provide for an efficient transportation on land and in the water. Other attempts to design amphibious, human powered vehicles involve the addition of oversized pontoons or floats to each of the existing vehicle wheel hubs. Such arrangements obviously require significant reconfiguration when transitioning from the water to land, or vice versa, and thus cannot be ridden directly into or out of the water and across the land. In addition, while a bicycle is well-balanced when used a land, it becomes unduly cumbersome to operate when floated on water due to the high center of gravity and the amount of weight and resistance resulting from the use of floats that are large enough to support the weight of the bicycle frame, the rider, and the mechanical structure needed to interconnect the vehicle to the floats. Accordingly, there is a need in the art for a vehicle that can easily transition between land and water while remaining an effective and efficient mode of transportation in both media.

BRIEF SUMMARY OF THE INVENTION

The present invention provides a recumbent-style cycle to have the benefit of low wind resistance with an exoskeleton monocoque shell to combine the functions of the cycle frame, boat hull, and aerodynamic fairing to minimize weight and improve water performance. The present invention combines the elements of a rounded nose and tapering shell and cycle components to create an all-new vehicle that has low wind resistance and the low center of gravity of a recumbent cycle with a fairing shell to further lower wind resistance, create the displacement of a boat hull, and an exoskeleton cycle frame to minimize weight.

The exoskeleton of the present invention functions as both a cycle frame and a boat hull that gives a user access to the waterways as a kayak-style boat. By avoiding the rate-limiting air resistance of upright cycles, the high efficiency of the design of the present invention translates into high speed on land. At the same time, the weight saving development of using the hull as a cycle frame minimizes weight.

The use of a boat hull to form an exoskeleton for supporting the recumbent cycle allows the craft to shed weight while preserving function. Furthermore, the primarily enclosed fusiform shape is more aerodynamic than current amphibious human powered vehicles. The combination of lightweight design, speed on land, ease of use, durability, and versatility is unmatched by other amphibious human powered vehicles. Familiar aerodynamic lines make the present invention attractive, and its comfort and stability makes it practical for regular road use.

The design of the present invention improves safety by protecting the rider from side impact and road abrasion. The low recumbent design places the rider at a lower initial height in the event of a crash lessening impact forces with the ground. The hull also acts to protect the rider and the lightweight nature of the vehicle lessens the energy of a crash to protect those involved. The present invention fits easily in bike lanes and on the road with passing cars. The present invention can also enter and exit the water by while being driven, and is light enough to be lifted by a single person.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a rear perspective view of an amphibious recumbent cycle and kayak according to the present invention;

FIG. 2 is a longitudinal cross-sectional view of an amphibious recumbent cycle and kayak according to the present invention;

FIG. 3 is bottom plan view of a steering assembly for an amphibious recumbent cycle and kayak according to the present invention;

FIG. 4 is a detailed cross-sectional view indicated by the line 4-4 of FIG. 2 of a stern notch of an amphibious recumbent cycle and kayak according to the present invention;

DETAILED DESCRIPTION OF THE INVENTION

Figure 5:
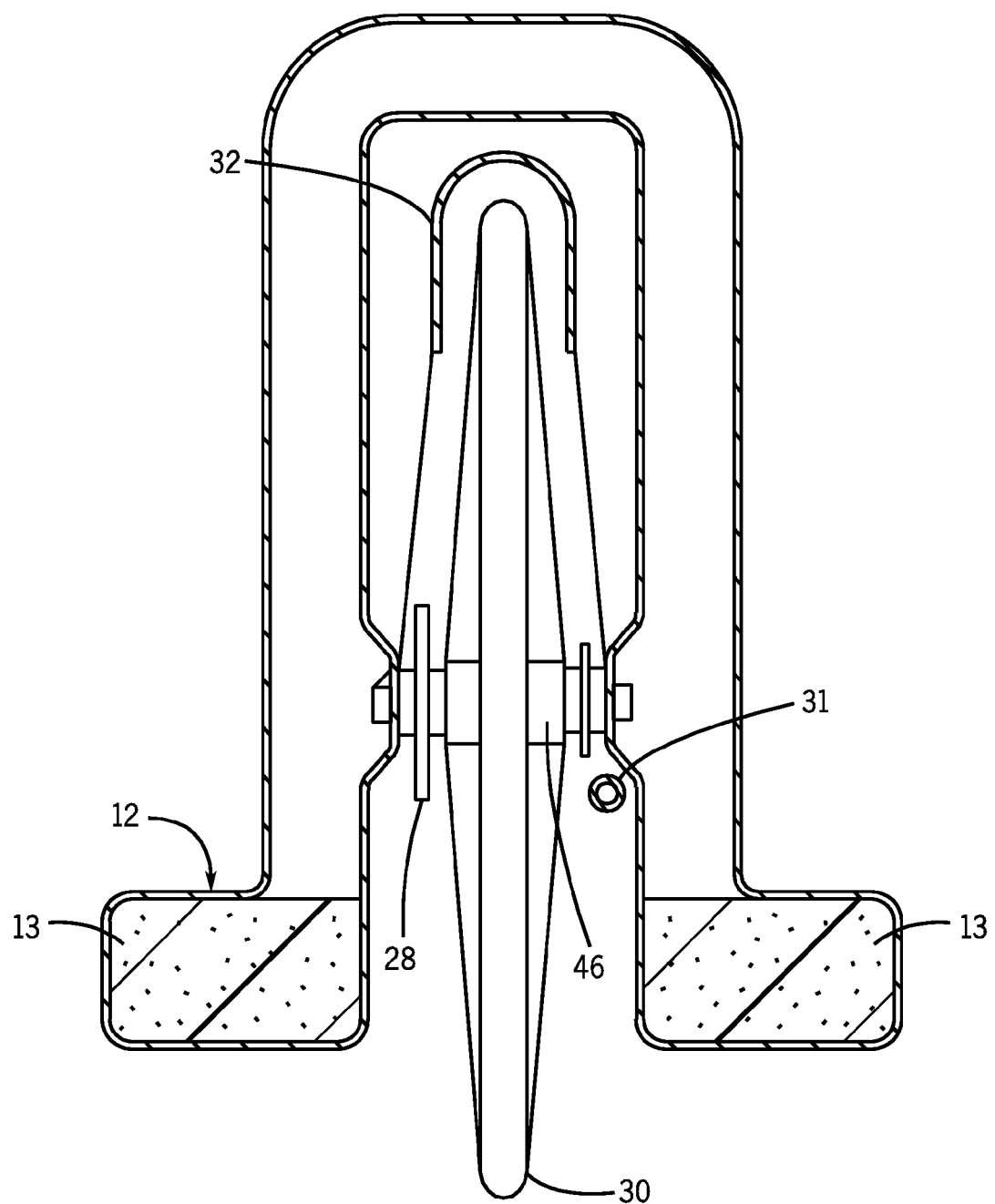
FIG. 5 is a detailed cross-sectional view taken on line 5-5 of FIG. 2.
Figure 6:
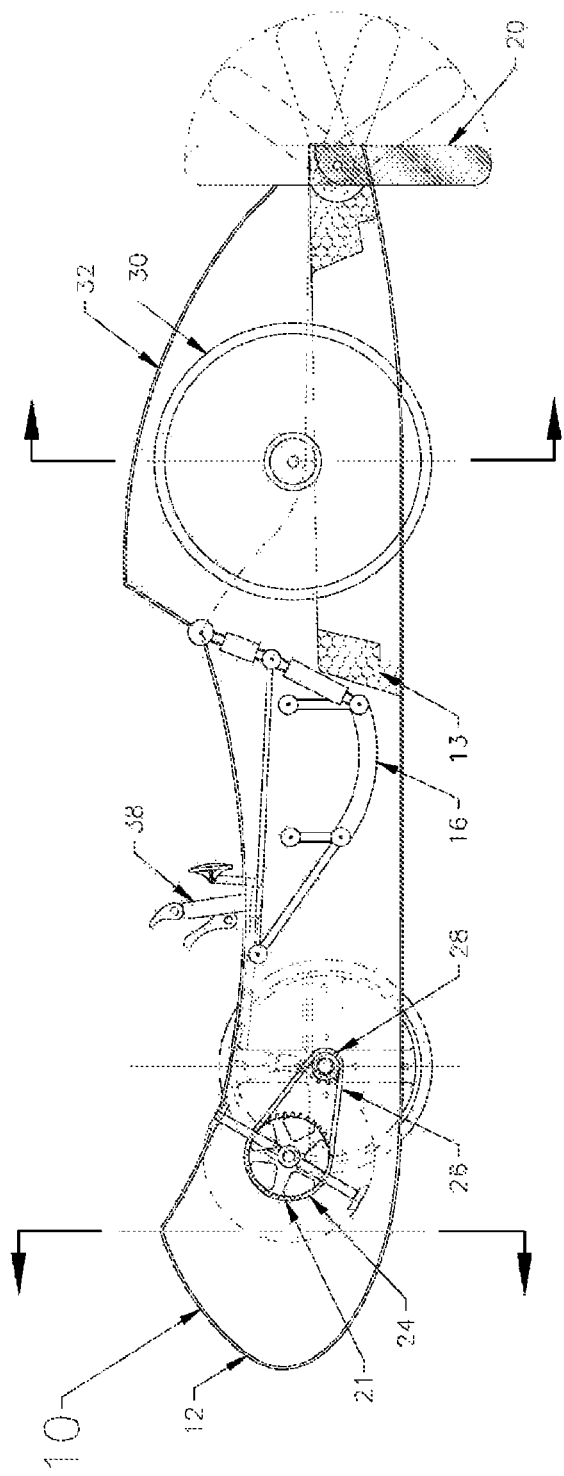
FIG. 6 is a longitudinal cross-sectional view of another embodiment of an amphibious recumbent cycle and kayak according to the present invention.
Figure 7:
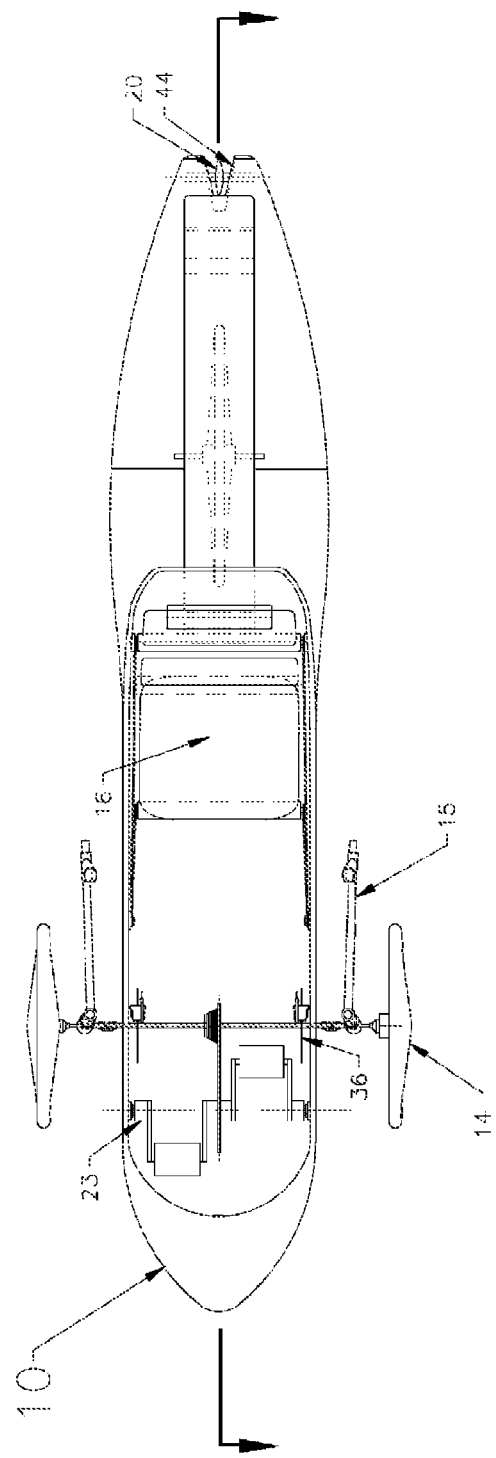
FIG. 7 is a top plan view of another embodiment of an amphibious recumbent cycle and kayak according to the present invention.
Figure 8:
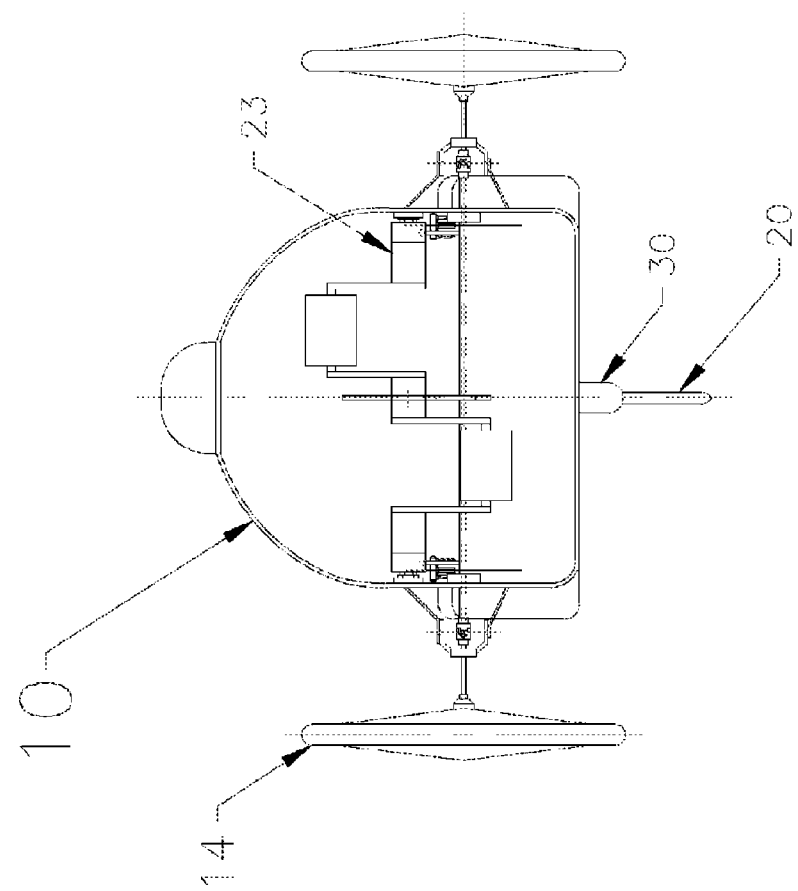
FIG. 8 is a transverse cross-sectional view of another embodiment of an amphibious recumbent cycle and kayak according to the present invention.
Figure 9:
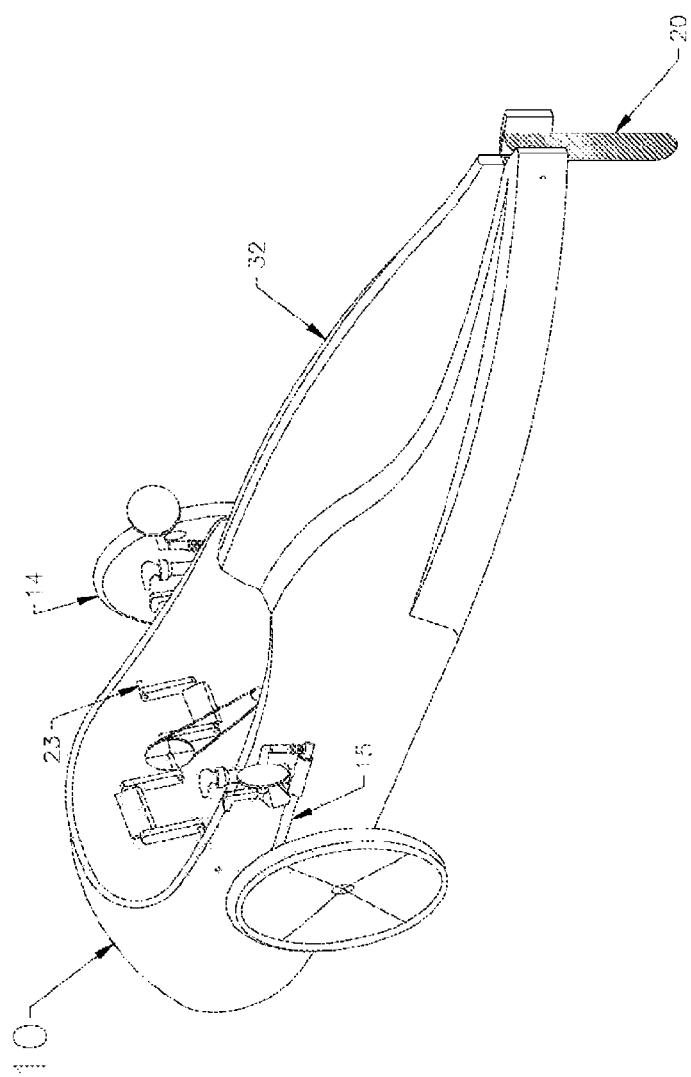
FIG. 9 is a perspective view of another embodiment of an amphibious recumbent cycle and kayak according to the present invention.

Referring now to the drawings, wherein like reference numerals refer to like parts throughout, there is seen in FIG. 1 an amphibious vehicle 10 according to the present invention that functions as an amphibious recumbent cycle and kayak. Vehicle 10 comprises a shell 12 that defines an inner passenger compartment and contains, in one or more predetermined sections, sufficient buoyant foam 13 to provide a buffer from hull breaches and allow the vehicle to still float if swamped or submerged. As explained in detail below, shell 12 also defines a hull, a front fairing, gunwales, a rear fairing, a floor, and a rear wheel well as well as providing an exoskeleton frame for the cycle components. Shell 12 is preferably formed from composite fabric and epoxy, and may include Kevlar or similar material positioned on its bottom surface to improve the ability of shell 12 to withstand physical blows and ensure that shell 12 is waterproof.

Shell 12 also provides for floatation of vehicle 10 when in water and can be contoured to provide the aerodynamic shape of vehicle 10. For example, the front fairing rises from the hull to create a nosecone-like shape for separating air and water and the rear fairing also rises from the hull beginning just behind the rider compartment and tapers to the rear enclosing the rear wheel and other components and creating a surface to attach objects and optimize airflow. The nosecone and sides utilize parabolic curves to optimize strength and force transfer during regular riding and in the event of an impact. In the event of an impact, forces applied to the apex of the parabolic nose and sides are re-directed outward at the bases away from the cockpit and the occupant. The tail tapers to improve aerodynamics. The shape thus reorganizes the air and minimizes turbulence to improve efficiency and speed. Gunwales rise up from the hull, creating the sides of the passenger compartment that are on either side of the rider. The boat hull is created by the aerodynamic shell/exoskeleton. A relatively flat bottom optimizes the needs for clearance while on land and displacement while in the water. Greater width improves stability and displacement, but impairs hydrodynamic efficiency, increases strain across the craft, increases overall weight, and takes up more space on land. As result, these dimensions may be adjusted for the particular use, but optimal dimensions for most combined land and marine purposes are similar to those of short kayaks in the 8-11 feet length and 20-30 inch width range.

Waterproof composite materials such as Kevlar and carbon fiber set with epoxy are able to created the strong light complex curves of shell 12. Shell 12 thus functions as a displacement hull. Optionally, shell 12 may include a foam floor to maintain the integrity of the boat if the hull is breached and to provide additional structural integrity. High-density foam can also be used beneath the composite to anchor fasteners of other components.

Shell 12 supports a pair of opposing front wheels 14 that are interconnected to a pair of handlebars 15 positioned in or proximately to the passenger compartment. Because of the unusual need of an amphibious craft to enter the water over many shores, which may include lips such as that of a dock or wall, shell 12 aft of front wheels 14 needs to be sufficiently wide and durable at that point to help prevent capsizing of vehicle 10.

As seen in FIG. 2, a user seat 16 is interconnected to shell 12 and positioned in the passenger compartment to allow a user to steer vehicle 10 using handlebars 15. Seat 16 may include a track mounting for easily adjusting the positioning of the seat. Seat 16 can be attached to the floor of the cockpit like traditional kayaks. However, the opportunity for a suspended seat 16 within the cockpit can enhance both comfort and vehicle longevity. The inner walls of vehicle 10 allow the seat to be suspended from above. The suspended seat 16 can both absorb the vibrations of riding while optimizing energy transfer from rider to the pedals by varying the elasticity of the suspension connections. The recumbent position and longitudinal connection allow the rider to exert force on the pedal in excess of his or her weight without being pushed out of the seat. Vibration absorption not only creates a more comfortable ride it prevents the forward momentum of rider from being redirected up and down and kinetic energy remains directed forward, making the vehicle more efficient. Minimizing downward forces lessens tire deformity, further improving efficiency. Finally, weaker vertical oscillations lessen the strain on shell 12 and wheels. Additional suspension can be incorporated into the attachments for any or all of the wheels to enhance these benefits at the cost of greater weight, complexity, and corrosion vulnerability.

As further seen in FIG. 1, shell 12 supports an optional propeller 18 and a rudder 20 for providing locomotion and steering when vehicle 10 is in water. Rudder 20 is preferably interconnected to handle bars 15 via releasable cleats so that rudder 20 can be disengaged from movement when vehicle 20 is on land. The outer edges of the stern extend just beyond rudder 20 to create a recess to protect rudder 20 as it slides over an edge during entry in water.

Referring to FIG. 2, vehicle 10 includes a single, rear wheel 30 for providing locomotion when vehicle is on land. Rear wheel 30 protrudes through the bottom of shell 12. Shell 12 waterproof integrity is maintained by the rear wheel well extension. Additional floatation and stability comes from aft hull flares. As a displacement hull, the length of shell 12 is proportional to hull speed. Longer boats are faster, however, the need on land for maneuverability and storage favor a shorter craft. Different lengths may therefore be used to reflect the demands anticipated for various designs.

Vehicle 10 may include a central pillar 22 for supporting a chain and gear assembly 21 having a user pedal crank 23 associated with a driving sprocket 24 that is connected via a chain 26 to a driven sprocket 28 associated with the front wile wheel 30. Alternatively, the chain can drive a sprocket on the rear wheel 30. In the alternative rear wheel design an internally geared hub is preferred and positioned on an axle supported directly by shell 12 within a rear wheel well 32, as further described herein.

A conventional upright cycle crank is familiar and easy to use, however, the torque generated on the central attachment of a cycle crank tends to bend the frame and pedaling energy is lost and it can even bend the frame sufficiently to derail the chain or belt. Exoskeleton of vehicle 10 allows the pedals and crank 23 to attach within bearings housed on the walls of the cockpit. Pedaling forces are directed along the wall of the shell and thus there is no torque around a central bracket. By allowing crank 12 to seat in bearings affixed to points on either side of the shell, the torque distributed throughout the shell and deformation associated with aggressive pedaling is essentially eliminated. This approach also obviates the need for a reinforced bottom bracket and reduces overall weight.

As seen in FIG. 2, shell 12 forms an internal fender for accepting and supporting wheel 30. The passenger compartment also includes a shift lever 34 for selecting between one or more driving sprockets, and a brake lever 36 for engaging brakes (not shown), such as conventional friction wheel/rim brakes.

As seen in FIG. 3, front wheels 14 are interconnected to shell 12 via a steering assembly 38 comprises of a steering tie rod 40 that is moveable via operation of handlebars 15 and that is connected between two opposing steering pivots 42 for steering both front wheels 14 in response to movement of handlebars 15. Vehicle 10 is best served by front wheel steering, but rear steering would simplify a front wheel drive system at the cost of becoming more unstable at higher speeds and during turns.

Referring to FIG. 4, shell 12 defines a stern notch 44 for housing propeller 18 and rudder 20, which are preferably pivotally connected to shell 12 for movement between a retracted, inoperable position (shown in FIG. 4) when vehicle 10 is to be used on land, and an extended, operable position (shown in phantom in FIG. 4) when vehicle 10 is to be used in water in response to user activation of flexible shaft 31. Stern notch 44 recesses rudder 20 to protect it during slides off of hard edges, such as when entering the water, but also off edges on land, such as curbs.

As seen in FIG. 5, rear wheel well 32 is preferably formed integrally by shell 12, which is also directly connected to the hub 46 of wheel 30 to limit the need for additional framing or supporting structure. Preferably, as further seen in FIG. 5, buoyant foam 13 may be positioned with shell 12 is predetermined locations to enable vehicle to float when in water. It should be apparent to those of skill in the art that the amount of foam and particular locations for placement of foam may vary depending on the amount of buoyancy needed and the particular balance needed to ensure that vehicle 10 remains upright when floating in water.

FIGS. 6 through 9 depict a slightly different embodiment of the present invention that omits propeller 18 and rearranges the various components slightly for improved ergonomics and maneuverability, with corresponding elements identified according to the above description.

As further seen in FIG. 1, shell 12 may include means for reliably retaining various user items, such as cargo hold-downs 50 and a paddle 52 for assisting with propelling or steering vehicle 10 when it is in water. Shell 12 may also include a mast 48 for improving visibility of vehicle 10 when in use. For example, mast 48 allows for placing lights and flags within sight of motorists or watercraft pilots. Although a user is free to turn around in the passenger compartment to see behind, a rear view mirror could be included to improve rider overall situational perception. Optional windscreen, fenders, and even a full enclosure can improve aerodynamics and rider comfort in inclement weather, although those benefits will be balanced by their additional weight and less airflow for cooling the rider.

The present invention thus employs shell 12 as cycle exoskeleton, aerodynamic fairing, and boat hull. Modern composite materials allow shell 12 to remain lightweight, abrasion tolerant, structurally rigid under rigorous operating conditions, and waterproof. The combination is very light and efficient, and helps provide for a human powered amphibious vehicle having high performance. The tadpole trike design utilized in the present invention places the two front wheels/steering/brakes forward of the rider, and on either side of vehicle 10, giving the craft excellent stability, balance, and handling on land. The hull dimensions and low center of gravity of vehicle 10 give it excellent stability in water. As a human powered vehicle, shell 12 operates as a displacement hull. Hull proportions are variable and can reflect the intended purpose like the kayak designs of past and present. For example, a length of 9 to 12 feet with a width of 20 to 30 inches is a good blend of usability, speed, and maneuverability on land and in the water.

A user of vehicle 10 sits in the cockpit seat with access to the pedals, handlebars, brakes, gear shifters, and front wheels. On land, the rudder (and optional propeller) is retained in an upright position with a conventional kayak rudder pivoting arrangement. The rudder steering cable may be released on one side from a tie rod cleat to free it from steering action while on land, and then to pull the rudder, flexible drive shaft, and propeller assembly away from the moving rear wheel. A user pedals and drives the rear wheel for propulsion, and the user steers as in a traditional recumbent tricycle.

Vehicle 10 can be driven directly into the water over many surface angles including sloped ramps, small to medium rocks, hard sand, snow, ice, and docks. The flat and durable bottom endures abrasion, while the width of vehicle 10 provides stability during the transition to flotation. Once in the water, propulsion and steering can be accomplished with a paddle or, optionally, propeller 18. Vehicle tracking in the water is improved by both the wheel covers and rudder. The rudder may be lowered as a conventional kayak rudder, and steering is engaged by attaching the free steering cable to a tie rod cleat. The rudder cable attaches to the tie rod to create steering in the water controlled by the handlebars.

Steering of the rudder via the handlebars is well paired with either paddles on the front wheels or the alternative propeller 18 fixed to the rudder. Propeller 18 may be driven by flexible shaft 31 interconnected to pedal crank 23 through conventional linkages. The pitch of the propeller can be configured to propel the vehicle forward as the rider pedals backward. Pedaling backwards on a freewheel allows the rear wheel to be locked in place, while still driving the propeller, by brake 36 to avoid pulling water unnecessarily into the passenger compartment. The pitch of propeller 18 provides forward thrust. The thrust is directed to port or starboard via rudder 20, which may be steered by the cables connected to a tie rod and controlled by handle bars 15. Leaving the water is more likely to require vehicle 10 to need to be pulled or lifted from the water, but on shallow grades with good traction a user can pedal or manually turn (in a rear wheel drive configuration) the front wheels to ride out of the water.

Vehicle 10 may be constructed by using composite fabric and epoxy over a mold. Foam may be laid down before the composite fabric to form a floor, high-density foam in the stern notch to allow the rudder to be screwed into place, and foam for the stability flares all complement the function of the shell while adding fairly little weight to the vehicle. Kevlar fabric is used for the underside.

Shell 12 is reinforced with bracing at the attachment points of the front forks, seat, front axle, rear axle, and center pillar. A composite and epoxy wheel well, similar to a sailboat's centerboard well but flared on the bottom, is built on a mold and cured. The wheel well gets pushed up through the opening for the rear wheel and epoxied in place.

Mounting brackets are attached with adhesive and hardware for the brakes, seat, derailleur, and any cargo netting.

Next, the seat is suspended from the mounting points or the seat track attached to the cockpit floor and the seat fitted to the track.

The front fork pivot point housings are attached to the reinforced shell sidewalls. The standard tadpole tricycle front handlebars, brake levers, gear shifters, forks, tie rod brackets, and wheels are assembled to fit the pivot point housing. A hole is cut in the shell to accommodate the tie rod, and the tie rod attached to the steering assembly. One clamp and one cleat are then attached to the tie rod to accept the rudder steering cables.

Holes are cut in the shell and the front axle bearing housing is attached. The central and outer front axles, with bearings, chainring(s) and brake disc(s) are assembled, secured within the front axle housing and attached to the front wheels.

Alternatively, with rear wheel drive, brackets are mounted to the floor of the shell for the chain guides and cable guides for the flexible axle and rudder cables. Another bracket is added for the accessory sprocket and right angle gear. The flexible axle is attached to the right angle gear and threaded through the guides back to the rudder assembly.

Crank bearing housings are attached on either wall inside the cockpit. The crank assembly is fit with the pedals, front chainring(s), and bearings and then into the housing.

Alternatively a standard bicycle crank can be used, but requires a center pillar be added to the cockpit attached to the floor and possibly the front edge of the cockpit. The center pillar with a standard size crank housing is fabricated of composite materials and epoxied and/or bolted to the reinforced floor and front edge of the cockpit. A standard crank assembly, chainrings, and derailleur are assembled on the central pillar. A chain tensioner is bolted or epoxied to the floor. The chain is incorporated in the usual way.

Holes are cut into the shell where the rear axle will mount and the shell is reinforced. The rear wheel may then be pushed up into the rear wheel well and the axle pushed through the shell and secured.

The propeller, shaft, and housing are bolted onto a standard kayak rudder. The kayak rudder assembly is screwed into the high-density foam or epoxied into place within the stern notch.

The cable systems to steer, raise, and lower the rudder are run through guides to cleats and clamps in the cockpit. The brakes and gear shifter cables are attached in the conventional manner. Aluminum and stainless steel fittings are preferred due to the use of vehicle 10 in water; caution is taken to minimize corrosion from allowing different metals to contact one another. In addition, all metal components and joints are sprayed with lubricating waterproofing spray such as lanolin.

The visibility mast bracket is epoxied to the rear fairing and mast attached. Attachment points for shock cord and straps are riveted in place and shock cord threaded and whipped. Reflective paint and/or tape may be applied for enhanced visibility. Finally, waterproof cycling lights are affixed fore and aft, port and starboard lights are optional.

Figure 10:
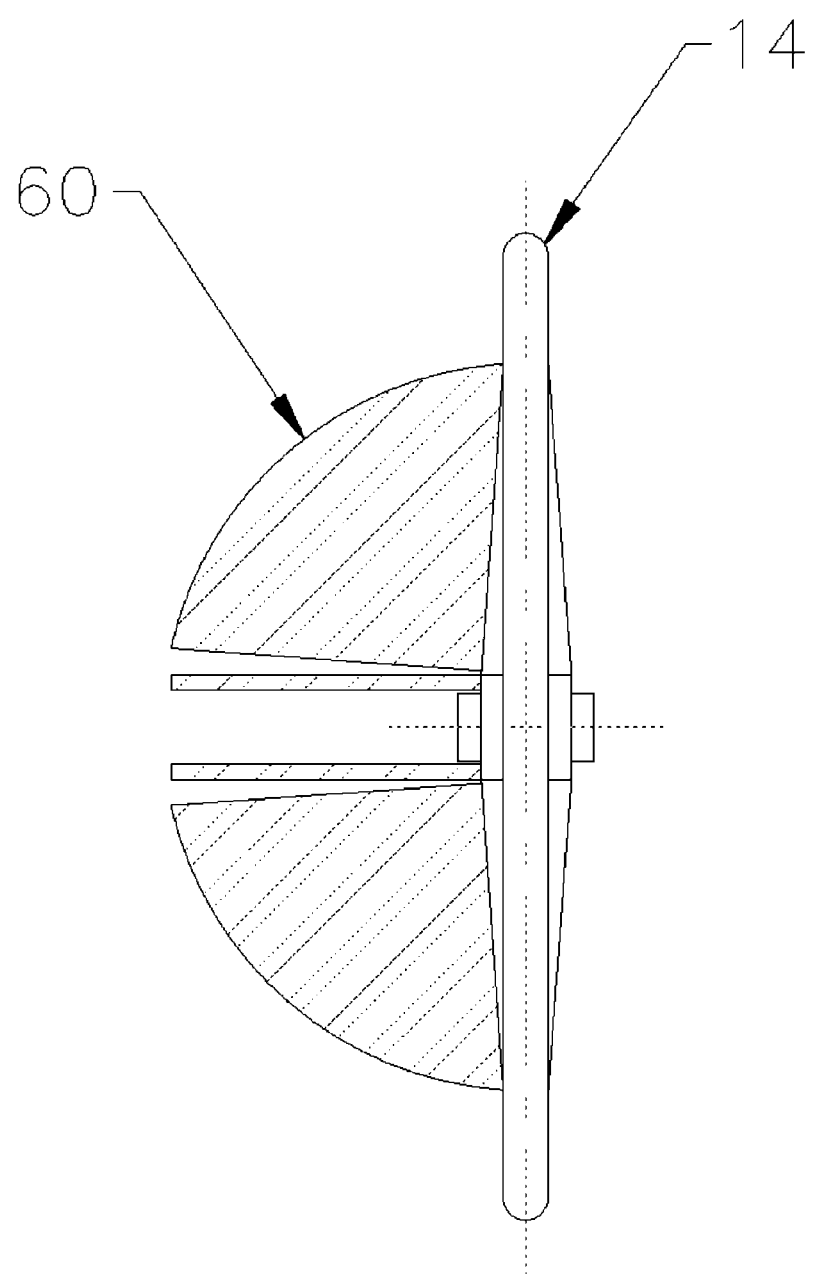
FIG. 10 is an end view of paddle wheel embodiment according to the present invention.
Figure 11:
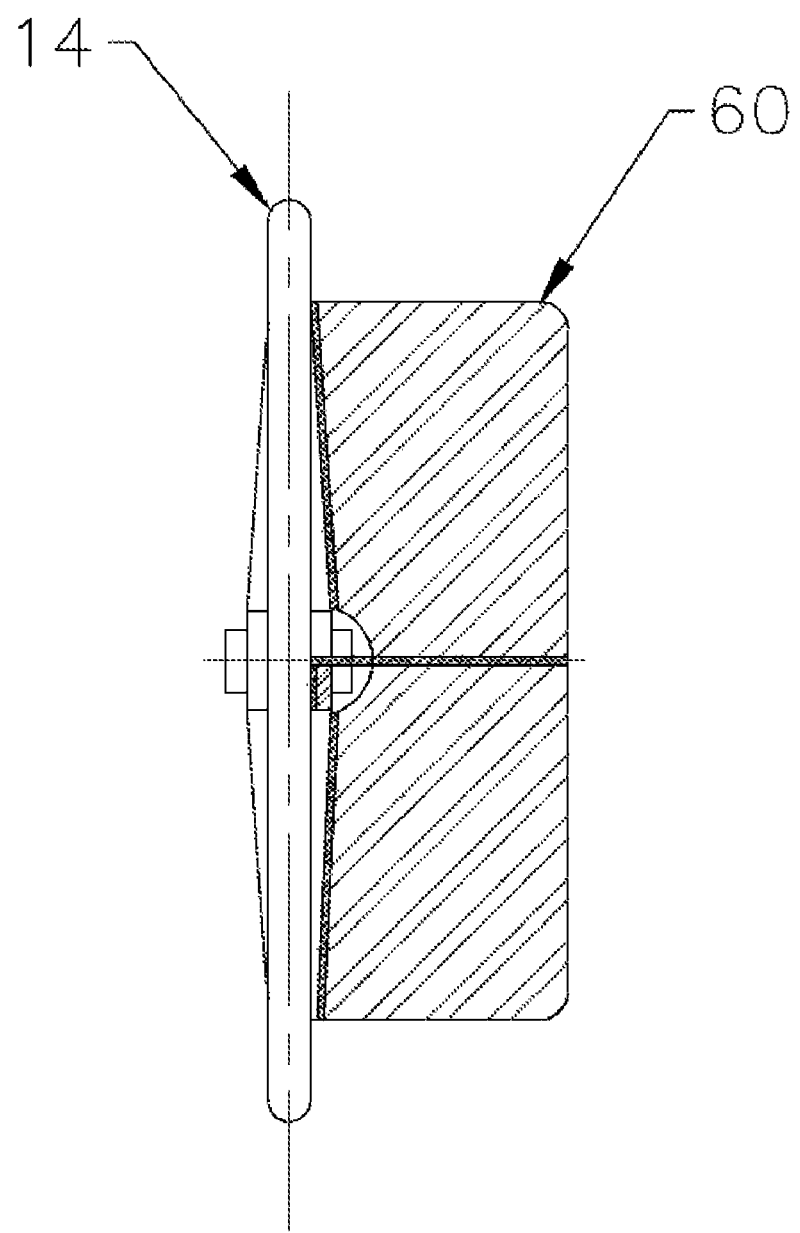
FIG. 11 is an end view of a second paddle wheel embodiment according to the present invention.

The preferred embodiment of the present invention thus uses a tadpole trike (two wheels in front, one in back) configuration that adds stability and thereby improves safety and practicality. In lieu of propeller 18, as seen in FIGS. 10 and 11, wheels 14 may be outfitted with paddles 60 allow the same drive train to propel the craft in or out of the water. Paddles 60, however, are by nature high resistance devices and ideally they would only be deployed when in the water and at low speeds, i.e., in or near the water. A front wheel drive embodiment allows the rider to directly access the drive wheels from the cockpit and engage or disengage paddles 60 manually. As seen in FIGS. 10 and 11, options for implementing paddles 60 include a wheel cover 62 with integrated pivoting paddles 60, paddles 60 attaching to the lateral surface of wheels 14, paddles 60 which wrap around the wheels 14, or wheels 14 which are replaced with paddles 60.

For example, one option is to build paddles into the wheel using the space between spokes to fit the paddles. They are able to hinge and affix flat when on the road, and are released, pivot out, and latch perpendicular to the wheel when at the shore or in the water. The second paddle assembly uses brackets on the outside of the spokes or disc to receive the paddles. Paddles on the outside of the wheels would not impact the hull when the wheels are turned in or out of the water and they could remain within the outer radius of the wheels, but be below the waterline when immersed. This allows the ARC to still ride on its tires with the paddles in place and confers the following benefits: they can be attached while on land and ride into the water, the paddles would be protected by the tires from striking the bottom, and the paddles and tires work cooperatively when exiting the water onto land. Finally, a tire with soft rubber or silicone or similar substance wheel wrap with paddle projections could be used and would propel the craft in the water and have a large degree of traction on land. It would have tremendous traction, but terrible speed on land. This option would work well to traverse soft and slippery shores into and out of the water, riding on its pliable paddles. Soft pliable paddles would be resists breaking on hard hazards, but they would also be less efficient in the water and the materials are heavier than their rigid counterparts.

An alternative two-wheel design similar to enclosed full fairing cycles would improve aerodynamics and top speed. In this embodiment, a single front wheel in lieu opposing wheels 14 would require a wheel well similar to that of rear wheel well 32 that extends above and below the waterline and is large enough to accommodate wheel pivoting necessary for turning when operating vehicle 10 on the road. The compromise with this embodiment is instability at low speeds and the need for additional elements for vehicle 10 to remain upright when stopped. The speed of this embodiment can be very fast and, when used with a full fairing, flat road speeds in excess of 50 mph are attainable. However, those high speeds begin to compromise real world safety and the embodiment is also unstable when stopped because the rider is confined to the cockpit and unable to reach a leg out to stabilize vehicle 10 when it is at rest. Thus, the user must use his or her arm, or a mechanical stabilizing arm must be deployed for starts and stops. This embodiment also requires a sharper dead-rise angle of the entire vehicle 10 because it has to lean while turning. The increased dead-rise angle detracts from water displacement and must be compensated for by riding lower in the water and/or increasing the other dimensions of the hull. It also creates a safety hazard when turning sharp because shell 12 may impact the ground and lift a tire off the ground, losing traction and control.

The primary design of vehicle 10 is minimalist and focuses on speed, durability, and versatility. The height of vehicle 10 and rider is low which improves handling and aerodynamics, but sacrifices visibility in complex traffic situations and limits the rider's range of vision when adjacent to other vehicles. Recumbent cycles in general can raise the rider by increasing the angle upward of the riding position and/or using taller wheels. The trade off in this arrangement is the wheels then project lower in the water, thereby increasing the draft of vehicle 10, and handling is less stable by virtue of the higher center of gravity. In addition, the aerodynamics are less favorable so top speed of vehicle 10 would also be diminished.

The design of the present invention invites the creation of spaces for gear and cargo, and even a passenger. Empty space necessary for aerodynamics and buoyancy can be netted off or compartmentalized without compromising function. The logical locations for such locations are forward in the nosecone of shell 12, along the gunwales on either side of the cockpit or passenger compartment of shell 12, or aft of the rider inside the rear fairing of shell 12. The outside of shell 12 can also be utilized in the same the way as traditional kayak deck to contain tie downs, lines, deck bags for gear, and a paddle for accessory propulsion and steering.

Additional passengers may be provided for by adding contours to shell 12 to facilitate a passenger directly behind the seated rider, or reinforcing the stability flare aft at the hull base to accommodate a standing passenger. The effect of these changes on aerodynamics can be minimized by using smooth transitions on the shell surface. Additional reinforcement of shell 12, and stronger wheels and axles would be necessary to accommodate for the overall weight of the vehicle.

Both adjustable seat positions and adjustable crank positions have been used in conventional recumbent designs to fit riders with different leg lengths. The preferred design of the present invention includes an adjustable seat 16, and positioning of pedal crank unit 23 on a central pillar 22 as a fixed central pillar 22 provides greater rigidity for a given weight. Greater rigidity improves energy transfer from the rider and improves performance. An adjustable seat also give the rider greater access to the aft area of the craft and allows various seat designs to be implemented without departing from the spirit of the invention.

As an alternative, a fixed seat design could save weight and increase mid-structure torsional rigidity by being incorporated directly into shell 12. To accommodate different size riders, the location of crank unit 23 may have to be adjustable. Options for providing this adjustment include an adjustable length central pillar 22, or a sliding crank unit 23 on pillar 22. While removing adjustability severely restricts the number of people who can comfortably pilot a given craft, an adjustable length central pillar 22 loses the desirable torsional rigidity and no longer supports the overall hull shape. An adjustable crank unit 23 can be accomplished by having crank unit 23 in a bracket, which slides outside pillar 22, or pillar 22 can be redesigned into two components with crank unit 23 in a bracket that moves inside the two. The latter option allows the components to become flat in the horizontal plane to optimize torsional rigidity in the plane of a user. The separate upper and lower components could also attach to opposite sides of the forward nosecone to enhance rigidity of shell 12 and crank unit 23. Adjusting the location of crank unit 23 more than a small amount requires adjusting the length of chain 26, which is cumbersome for most riders. A belt drive, such as a carbon belt, is more durable than chain 26, but not adjustable in length, so separate belts would be required for each position of the crank housing.

Traction on a variety of surfaces is a higher priority for vehicle 10 of the present invention than non-amphibious cycles for two reasons. First, the boundaries between land and water often include challenging terrain that a non-amphibious cycle is not accustomed to traversing. Second, the stabile, low center of gravity of a tadpole trike, combined with the large hull surface that can ride down snow covered hills invites travel, race, and adventure on slippery surfaces including wet roads, mud, snow, and ice.

A front wheel drive system is used in some recumbent cycles. A front wheel drive system in this vehicle would have the benefits of shortening the chain or belt, doubling the drive contact patch size for traction, and giving the rider easy access to the drive wheels. Traction is also dependent on weight balance, and with drive wheels in front the rider can easily shift his or her weight forward in slick or high resistance conditions, such as wet, ice, sand, snow, or gravel. By contrast, a rider cannot as effectively shift weight backward to adjust to variable conditions to influence rear wheel traction. In addition, the front wheels are readily accessible to the rider from the cockpit to adjust tire pressure to meet traction demands and lower rolling resistance by increasing pressure on hard surfaces to optimize speed.

An embodiment of the present invention that uses a front wheel drive system is best paired with front steering as rear steering becomes unstable at speed, especially during turns, because of the dynamics of acceleration with rear drive. As a result, some complexity and parts not typically found on cycles or kayaks are necessary. For example, a convention front drive and steering combination may be used, but these require universal joints and a longer axle. Consideration must also be given to the location of the axle to allow for pedaling the crank and to account for weight distribution between the fore and aft wheels, and the resulting effect on handling dynamics. Despite the challenges of the additional components and the added complexity of a front drive system, the overall effect could increase the versatility and performance over a rear wheel drive configuration.

An alternative with rear wheel drive uses paddles attached to the rear wheel off the ground, but below the water line similar to the front wheel drive option, but on both sides of the wheel. The wheel well would have to be widened to accommodate them, thereby losing some of the water displacement of the hull. The shell would block most of the airflow from reaching the paddles when riding on land to mitigate the aerodynamic inefficiency. However, significant turbulence would still be created and slow the vehicle especially at higher speeds.

The components for rear wheel drive are commonly used in cycling, readily available, and easy to interchange. The rear wheel compartment has less space flexibility than the front to include a rear gear set and derailleur because it is set within the wheel well. Removing the derailleur in favor of an internally geared hub is an option, however, also removes the possibility of incorporating a propeller drive directly to a chain ring free from the rear wheel axle. It requires a longer chain or belt and components are not easily accessible from the cockpit. Because of that it incurs weight and loses flexibility.

The low ground clearance of vehicle 10 creates limitations upright bikes do not have. The tadpole trike embodiment however does have good performance on trails as the three-wheel design allows the front wheels to ride on either side of the trail and the rear down the middle. The overall width is only about six inches greater than the width of a rider's shoulders on an upright bicycle. Although vehicle 10 cannot jump over a log for example, its lower height allows the rider to go under obstacles an upright cycle cannot.

A specific challenge to amphibious vehicles is traversing shores. They may be sandy, rocky, slippery, or sheer. Another advantage of vehicle 10 is it can be lifted, hoisted, and carried by a single rider. Front wheel drive allows the rider to adjust the wheels on arrival from the cockpit to lower the air pressure or add high traction/paddle tire wraps. Low sheer edges present different challenges. Sheer edges tend to clip the stern as the craft slides over the edge into the water. A narrow aft leaves the craft vulnerable to capsizing, so a wider aft provides stability. Any protruding element can be broken off. The rudder assembly, for example, is vulnerable to damage from the sheering action and is better protected by a recess into the stern.

Once in the water, vehicle 10 functions as a short displacement hull boat similar to a kayak. One primary improvement is that it can be pedaled to the shore and powered by pedaling. The streamline shape forms an efficient boat. On many shores, vehicle 10 can be ridden into the water including dock edges, stone, beach, and ice. On favorable shores, vehicle 10 can be ridden out of the water. Alternatively, it can be pulled, lifted, or even hoisted vertically on a rope or strap by a single person.

Safety primarily involves crash avoidance. Vehicle 10 balances speed improvements beyond upright cycles, but not to the extent of very high speeds and poor handling of a fully enclosed recumbent cycle. Vehicle 10 benefits from the excellent handling of the tadpole trike design. Vehicle 10 also allows riders to avoid congested roadways by traversing waterways and trails where there is less traffic. The tadpole trike design allows the best stability at high and low speeds. At low speeds and stopped the configuration will remain upright with or without a passenger in the cockpit. Under high g-force cornering the tadpole design commonly allows the contact surfaces of the wheels lateral slide before the vehicle rolls over its longitudinal axis, not unlike a go kart or a sports car. Three wheels on the ground creates also greater braking power and greater stability during braking. In the event of a crash, the design of vehicle 10 improves safety by protecting the rider from side impact and road abrasion. In the event of lateral impact or overturning and sliding the lateral walls create a barrier between the rider and the insulting forces. Vehicle 10 preferably uses parabolic curves on the front and sides to optimize the shell's impact resistance, not unlike an elongated egg with a tapering tail.

Often cycling injuries occur because of the high initial height when a rider falls. The low recumbent design places the rider at a lower initial height in the event of a crash lessening impact forces with the ground compared to upright cycles. The deceleration of a collision will propel the rider and any loose items forward. Injury could be sustained by colliding with the structures in front. Cockpit design must take this into account in the shape and layout of items in front of the rider. Also, this type of injury can be avoided with the addition of a seat/safety belt.

What is claimed is:

1. An amphibious vehicle, comprising:
   a shell having an exterior surface defining a displacement hull and an interior surface defining a passenger compartment therein, wherein said shell has a first end, a middle portion, and a second end and a longitudinal axis, wherein the widest point of said exterior surface follows a parabolic curve along the longitudinal axis such that said first end and said second end are tapered with respect to said middle portion and wherein foam is positioned between said interior and exterior surfaces;
   a single wheel positioned in a wheel well formed in a first fairing in a first end of said shell and mounted directly to said shell, wherein the wheel well fully encloses at least the top half of the wheel, such that at least a portion of the bottom of the wheel extends beneath the shell to contact when the ground when the amphibious vehicle is used on land;
   a pair of wheels rotatably mounted to said second end of said shell on opposite sides of a second fairing;
   a seat suspended directly from the interior surface of said shell;
   a plurality of paddles interconnected to said pair of wheels, wherein the paddles comprise a plurality of blades and each blade can extend in parallel to an axis of rotation of said pair of wheels and away from the shell, said paddles are pivotally mounted to said pair of wheels for movement between a retracted position and an extended position;
   a steering assembly interconnected to said pair of wheels and driven by a pair of handlebars positioned in said passenger compartment;
   a propeller and a rudder pivotally mounted to said rear fairing and interconnected to said steering assembly; and
   a pedal assembly comprising a pedal crank and drive sprocket positioned in the passenger compartment, supported by the interior surface of said shell, and interconnected to one of said wheels.

2. The vehicle of claim 1, wherein said paddles are detachably interconnected to said pair of wheels for movement between an engaged positioned where said paddles are attached to said wheels and a disengaged position where said paddles are removed from said wheels.

* * * * *